(12) United States Patent
Buckley et al.

(10) Patent No.: US 12,416,491 B2
(45) Date of Patent: Sep. 16, 2025

(54) METHOD AND SYSTEM FOR MEASUREMENT OF COKE DRUM DEFORMATION

(71) Applicant: AMEC FOSTER WHEELER USA CORPORATION, Houston, TX (US)

(72) Inventors: John C. Buckley, Spring, TX (US); Robert J. Clark, Kechi, KS (US)

(73) Assignee: Amec Foster Wheeler USA Corporation, Houston, TX (US)

( * ) Notice: Subject to any disclaimer, the term of this patent is extended or adjusted under 35 U.S.C. 154(b) by 322 days.

(21) Appl. No.: 17/500,250

(22) Filed: Oct. 13, 2021

(65) Prior Publication Data
US 2022/0113128 A1    Apr. 14, 2022

Related U.S. Application Data

(60) Provisional application No. 63/091,602, filed on Oct. 14, 2020.

(51) Int. Cl.
| | | |
|---|---|---|
| *G01B 11/16* | (2006.01) | |
| *G01S 7/48* | (2006.01) | |
| *G01S 17/42* | (2006.01) | |

(52) U.S. Cl.
CPC ............ *G01B 11/16* (2013.01); *G01S 7/4808* (2013.01); *G01S 17/42* (2013.01)

(58) Field of Classification Search
CPC ....... G01B 11/16; G01B 11/026; G01S 17/42; G01S 7/4808
See application file for complete search history.

(56) References Cited

U.S. PATENT DOCUMENTS

| | | |
|---|---|---|
| 5,425,279 A | 6/1995 | Clark et al. |
| 9,940,702 B1 | 4/2018 | Clark et al. |
| 2003/0066638 A1 | 4/2003 | Qu et al. |
| 2010/0007729 A1 | 1/2010 | Clark et al. |
| 2010/0326637 A1* | 12/2010 | Sasaki ............... H01L 21/67109 118/695 |

(Continued)

FOREIGN PATENT DOCUMENTS

| | | |
|---|---|---|
| CN | 103868465 A | 6/2014 |
| CN | 109959343 A | 7/2019 |

*Primary Examiner* — Hina F Ayub
(74) *Attorney, Agent, or Firm* — WINSTEAD PC

(57) ABSTRACT

A coke drum measurement system includes a first target coupled to an upper aspect of a coke drum and a second target arranged generally perpendicular to the first target. A first optical measurement device is arranged to visualize the first target and measure a distance between the first optical measurement device and the first target. A second optical measurement device is arranged to visualize the second target and measure a distance between the second optical measurement device and the second target. A processor is electrically coupled to the first optical measurement device and the second optical measurement device. The processor receives signals from the first optical measurement device and the second optical measurement device corresponding to movement of the coke drum. The processor aggregates signals received from the first optical measurement device and the second optical measurement device to determine a total movement of the coke drum.

20 Claims, 9 Drawing Sheets

(56) References Cited

U.S. PATENT DOCUMENTS

| | | | |
|---|---|---|---|
| 2012/0250004 A1* | 10/2012 | Parker | G01C 15/002 |
| | | | 356/614 |
| 2014/0144071 A1 | 5/2014 | Dohi et al. | |
| 2014/0262731 A1 | 9/2014 | Meyer | |
| 2016/0274001 A1* | 9/2016 | Parker | G01C 15/002 |
| 2017/0145319 A1* | 5/2017 | Vivas Chacón | C10G 9/005 |
| 2019/0145769 A1* | 5/2019 | Sasaki | G01C 3/08 |
| | | | 356/4.01 |
| 2019/0347783 A1* | 11/2019 | Salgian | G02B 27/017 |
| 2022/0213864 A1* | 7/2022 | Abe | F03B 15/08 |

* cited by examiner

METHOD AND SYSTEM FOR MEASUREMENT OF COKE DRUM DEFORMATION

CROSS-REFERENCE TO RELATED APPLICATIONS

The present application claims priority to, and incorporates by reference the entire disclosure of, U.S. Provisional Patent Application No. 63/091,602, filed on Oct. 14, 2020.

TECHNICAL FIELD

The present application relates generally to coking systems and more particularly, but not by way of limitation, to systems and methods for measuring the deformation of a coke drum due to thermal expansion.

BACKGROUND

This section provides background information to facilitate a better understanding of the various aspects of the disclosure. It should be understood that the statements in this section of this document are to be read in this light, and not as admissions of prior art.

Coke-drum systems are frequently utilized in production of petroleum products such as, for example, gasoline, diesel fuel, fuel oil, and other similar products. A coke drum system typically includes a support pad or table top. A support structure is constructed above the support pad and a coke drum is disposed within the support structure. The coke drum is laterally unrestrained except at its support base ring and is vertically supported by the support pad. The coke drum is typically an enclosed metallic vessel often weighing on the order of several hundred tons. During operation, fluids enter the coke drum at high temperatures and induce thermal expansion of the coke drum. Further, water is typically introduced to the coke drum during operation thereby causing rapid cooling of the coke-drum contents. The introduction of heated fluids to the coke drum, and subsequent rapid cooling, induces significant temperature distributions inside the coke drum. Movement of the fluids within the coke drum often causes the temperature distributions to be uneven on the surface of the coke drum. Such uneven temperature distributions can lead non-uniform thermal expansion of the coke drum. During operation, it is common for the coke drum to bend to one side and assume a curved, banana-like shape. This phenomenon is commonly referred to as "the banana effect" or "banana movement". Due to the size of the coke drum, such thermal expansion is often in the range of 4-6 inches. For this reason, there is minimal structural interconnection between the coke drum and the support structure so as to allow room for thermal expansion and contraction of the coke drum without damaging the coke drum or a surrounding support structure.

While coke drums and their associated equipment are often designed to accommodate thermal expansion and banana movement, frequent inspection and monitoring is required to ensure that any movement of the coke drum remains within acceptable tolerances. Currently, visual inspection of the coke drum is utilized to monitor the condition of the coke drum and associated equipment and piping. However, visual inspection is time consuming and does not offer continuous monitoring of coke-drum movement. Excessive thermal expansion or banana movement can lead to material fatigue and cause premature failure of the coke drum and associated equipment and piping. Coke-drum equipment and piping failures result in production interruptions and considerable expense associated with repairs. Such failures can result in fire and potential injury to personnel.

SUMMARY

This summary is provided to introduce a selection of concepts that are further described below in the detailed description. This summary is not intended to identify key or essential features of the claimed subject matter, nor is it intended to be used as an aid in limiting the scope of claimed subject matter.

Aspects of the invention relate to a coke drum measurement system. The coke drum measurement system includes a first target coupled to an upper aspect of a coke drum and a second target coupled to the same or another upper aspect of the coke drum. The second target is arranged generally perpendicular to the first target. A first optical measurement device is arranged to visualize the first target and measure a distance between the first optical measurement device and the first target. A second optical measurement device is arranged to visualize the second target and measure a distance between the second optical measurement device and the second target. A processor is electrically coupled to the first optical measurement device and the second optical measurement device. The processor receives signals from the first optical measurement device and the second optical measurement device corresponding to movement of the coke drum. The processor aggregates signals received from the first optical measurement device and the second optical measurement device to determine a direction and a total movement of the coke drum.

Aspects of the invention relate to a method of measuring coke drum deformation. The method includes measuring a distance between a first target and a first optical measurement device along a first horizontal axis. The method also includes measuring a distance between a second target and a second optical measurement device along a second horizontal axis. A signal is transmitted from the first optical measurement device to a processor. The signal corresponds to movement of the coke drum along the first horizontal axis. A signal is transmitted from the second optical measurement device to the processor. The signal corresponds to movement of the coke drum along the second horizontal axis. A processor calculates a direction and a total movement of the coke drum.

Aspects of the disclosure relate to a method of measuring movement of a coke drum. The method includes transmitting an electromagnetic beam from an optical measurement device to a target. A location of the electromagnetic beam to the target is recorded. Movement of the coke drum is determined based on movement of the electromagnetic beam to the target.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments of the present invention will now be described more fully with reference to the accompanying drawings. The invention may, however, be embodied in many different forms and should not be construed as limited to the embodiments set forth herein.

Figure 1:
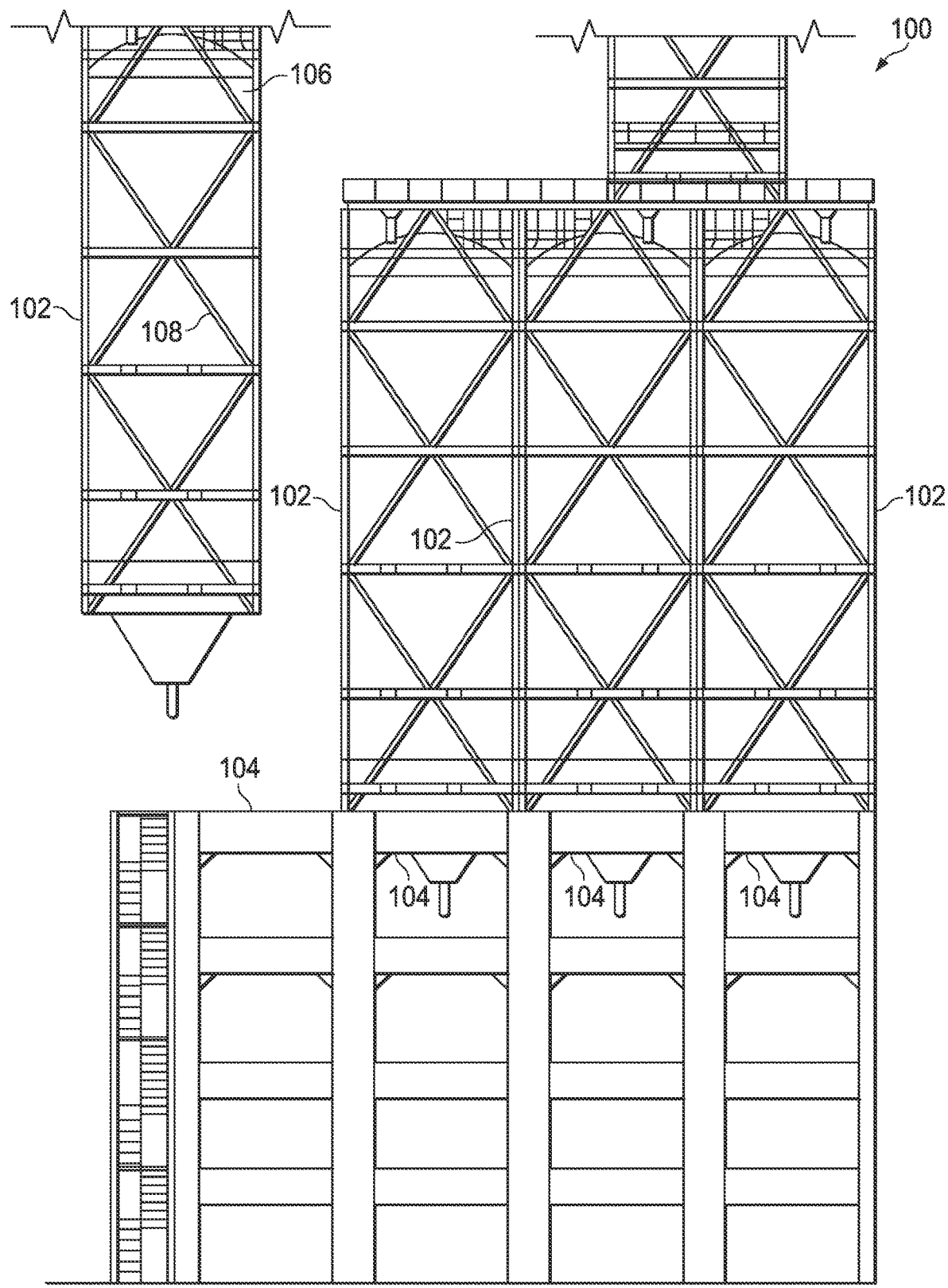
FIG. 1 is a schematic diagram of a coke drum system according to aspects of the disclosure.

FIG. 1 is a schematic diagram of a coke drum system 100. The coke drum system 100 includes a coke drum module 102 placed upon a support pad 104. The coke drum module 102 includes a coke drum 106 placed inside a support frame 108. By way of example, the coke drum system 100 illustrated in FIG. 1 shows four coke drum modules 102 and four support pads 104. However, in other embodiments, coke drum systems utilizing principles of the invention may include any number of coke drum modules and any number of support pads.

Figure 2:
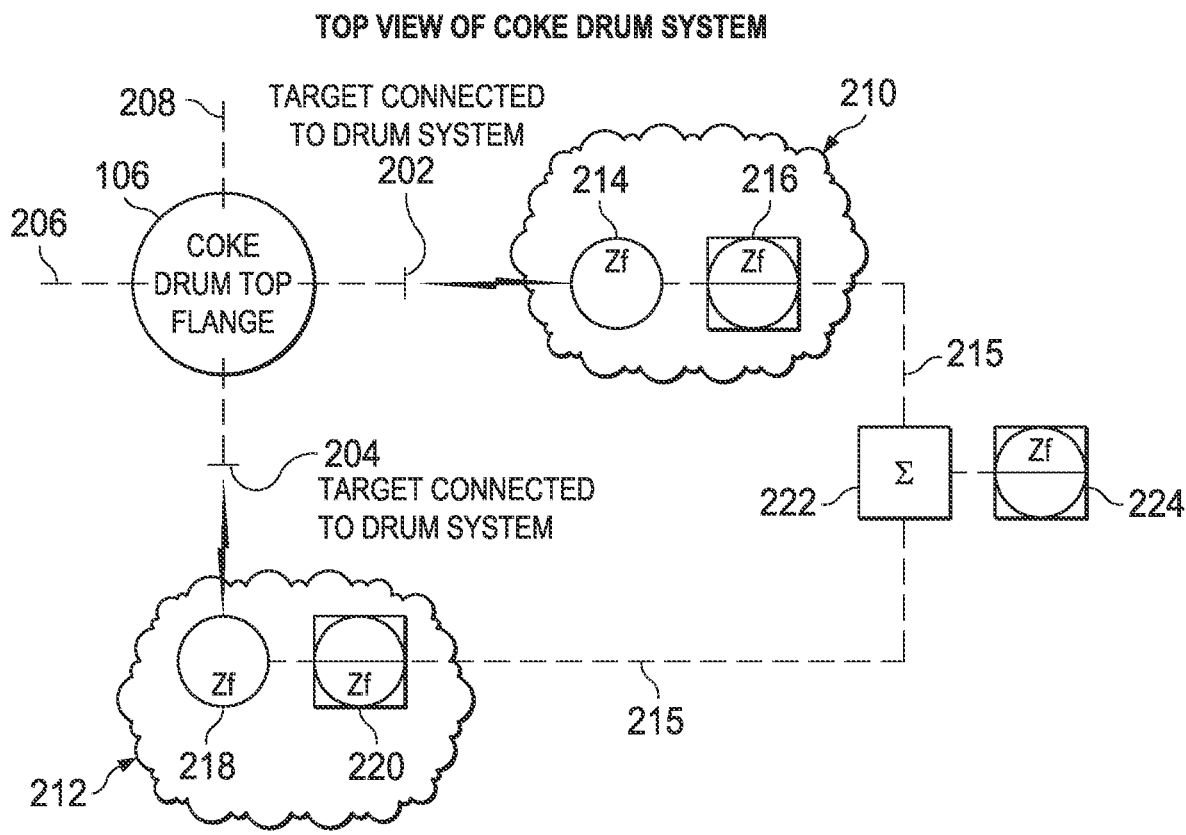
FIG. 2 is a schematic diagram of a two-axis coke-drum measurement system according to aspects of the disclosure.

FIG. 2 is a schematic diagram of a two-axis coke-drum measurement system 200. The two-axis coke-drum measurement system 200 includes a first target 202 associated with the coke drum 106 and a second target 204 associated with the coke drum 106. The first target 202 is aligned with a first horizontal axis 206 of the coke drum 106 and the second target 204 is aligned with a second horizontal axis 208 of the coke drum 106 such that the second target 204 is arranged generally orthogonal to the first target 202. As shown by way of example in FIG. 2, the first horizontal axis 206 is the "x" axis of the coke drum 106, when the coke drum 106 is viewed from above and the second horizontal axis 208 is the "y" axis of the coke drum 106. In various embodiments, the first target 202 and the second target 204 are coupled, for example, to an upper aspect of the coke drum 106. In other embodiments, however, the first target 202 and the second target 204 may be coupled to any exterior portion of the coke drum 106. In still other embodiments, the first target 202 and the second target 204 may be coupled to other components of the coke drum system 100 that move during thermal expansion and contraction of the coke drum 106 such as, for example, components of the piping or devices that move during thermal expansion and contraction of the coke drum 106.

Still referring to FIG. 2, the two-axis coke-drum measurement system 200 includes a first optical measurement device 210 and a second optical measurement device 212. The first optical measurement device 210 is arranged to visualize the first target 202 and the second optical measurement device 212 is arranged to visualize the second target 204. In a typical embodiment, the first optical measurement device 210 and the second optical measurement device 212 are, for example, laser measurement devices; however, other devices could be utilized including, for example, infra-red devices, electromagnetic devices, or other devices capable of measuring a distance without contact with an accuracy of, for example, approximately +/−3 mm. In various embodiments, the first optical measurement device 210 and the second optical measurement device 212 could be, for example, a Micro-Epsilon model ILR2250-100 meter available from Micro-Epsilon. The first optical measurement device 210 measures a linear distance between the first target 202 and the first optical measurement device 210 along the first horizontal axis 206. The second optical measurement device 212 measures a linear distance between the second target 204 and the second optical measurement device 212 along the second horizontal axis 208. In various embodiments, the first optical measurement device 210 and the second optical measurement device measure distances utilizing any optical-distance-measurement methodology including, for example, time-of-flight measurement, triangulation, vision-based measurement, confocal sensing, interferometry, conoscopic holography, or other appropriate method. In various embodiments, the first optical measurement device 210 includes a first light source 214 and a first measurement unit 216. In various embodiments, the second optical measurement device 212 includes a second light source 218 and a second measurement unit 220. In various embodiments, the first light source 214 and the first measurement unit could be separate or integral devices. Similarly, the second light source 218 and the second measurement device 220 could be separate or integral devices.

Still referring to FIG. 2, the first optical measurement device 210 and the second optical measurement device 212 are coupled to a processor 222 via a data bus 215. In various embodiments, the data bus 215 could be a wired or a wireless coupling. In a various embodiments, the data bus 215 may include, for example, any combination of hardware, software embedded in a computer readable medium, or encoded logic incorporated in hardware or otherwise stored (e.g., firmware) to couple components of the two-axis coke-drum measurement system 200 to each other. As an example and not by way of limitation, the data bus 215 may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 215 may include any number, type, or configuration of data buses 215, where appropriate.

The processor 222 may be any microprocessor, microcontroller, programmable element, or other device or collection of devices for aggregating and computing measurements provided by the first optical measurement device 210 and the second optical measurement device 212. The processor 222 receives, for example, signals from the first optical measurement device 210 corresponding to changes in distance between the first target 202 and the first optical measurement device 210 along the first horizontal axis 206. The processor 222 also receives, for example, signals from the second optical measurement device 212 corresponding to changes in distance between the second target 204 and the second optical measurement device 212 along the second horizontal axis 208. During operation the processor 222 aggregates the measurements received from the first optical measurement device 210 and the second optical measurement device 212 in order to determine an aggregate movement of the coke drum 106. In various embodiments, the processor 222 is coupled to an output device 224. The output device provides real-time measurements of deformation of the coke drum 106 and provides an alert when deformation of the coke drum 106 exceeds a pre-determined threshold. In various embodiments, the pre-determined threshold may be, for example, approximately 2 inches in any direction. In other embodiments, any threshold could be utilized. In various embodiments, the alert may be, for example, an auditory alert, a visual alert, or a combination of an auditory alert and a visual alert. In various embodiments, the processor 222 may initiate corrective action when the deformation of the coke drum 106 exceeds the pre-determined threshold. For example, in various embodiments, the processor 222 may direct a reduction in the rate that water is added to the coke drum 106 when the coke drum 106 is being cooled. Such a reduction in the addition of water reduces a rate of cooling of the coke drum 106 and lessens thermal deformation of the coke drum 106.

Figure 3:
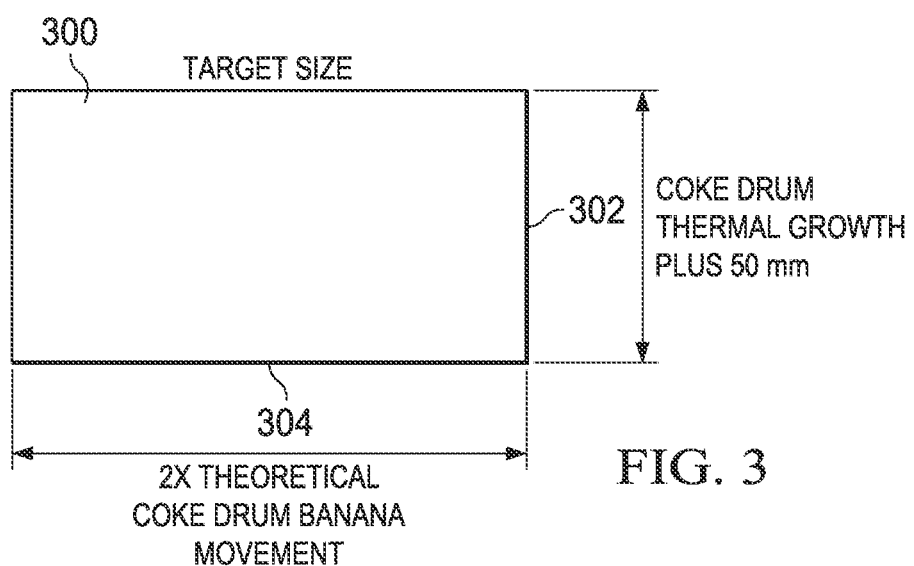
FIG. 3 is a plan view of a measurement target for use with the two-axis coke-drum measurement system of FIG. 2.

FIG. 3 is a plan view of a measurement target 300 for use with the two-axis coke-drum measurement system 200. For purposes of discussion, the measurement target 300 is representative of both the first target 202 and the second target 204. In various embodiments, the measurement target 300 is rectangular; however, in other embodiments, the measurement target 300 could be any appropriate shape. The measurement target 300 includes a vertical dimension 302. The vertical dimension 302 has a length that is approximately equal to the anticipated vertical thermal growth of the coke drum 106 plus, for example, 50 mm. Such a dimension allows a measurement device such as the first optical measurement device 210 or the second optical measurement device 212 to visualize the measurement target 300 as the measurement target 300 moves with the vertical thermal expansion of the coke drum 106. The measurement target 300 includes a horizontal dimension 304. The horizontal dimension 304 has a length that is approximately equal to two times the theoretical anticipated banana movement of the coke drum 106. Such a dimension allows a measurement device such as the first optical measurement device 210 or the second optical measurement device 212 to visualize the measurement target 300 as the coke drum 106 experiences lateral banana movement.

Referring to FIGS. 1-3 collectively, during operation, the first optical measurement device 210 initially focuses light along the first horizontal axis 206 (i.e. the "x" direction) on the top center of the first target 202. As the coke drum 106 undergoes thermal expansion in the vertical direction (i.e. the "z" direction), the first target 202 moves upwardly relative to the first optical measurement device 210. Thus, the light focused by the first optical measurement device 210 becomes more centered top to bottom on the first target 202. As the coke drum 106 experiences banana movement along the second horizontal axis 208 (i.e. the "y" direction), the light focused by the first optical measurement device 210 moves to the right or to the left on the first target 202. Additionally, as the coke drum 106 experiences banana movement along the second horizontal axis 208 (i.e. the "y" direction), the distance between the second target 204 and the second optical measurement device 212 may increase or decrease.

Still referring to FIGS. 1-3 collectively, during operation, the second optical measurement device 212 initially focuses light along the second horizontal axis 208 (i.e. the "y" direction) on the top center of the second target 204. As the coke drum 106 undergoes thermal expansion in the vertical direction (i.e. the "z" direction), the second target 204 moves upwardly relative to the second optical measurement device 212. Thus, the light focused by the second optical measurement device 212 becomes more centered top to bottom on the second target 204. As the coke drum 106 experiences banana movement along the first horizontal axis 206 (i.e. the "x" direction), the light focused by the second optical measurement device 212 moves to the right or to the left on the second target 204. Additionally, as the coke drum 106 experiences banana movement along the first horizontal axis 206 (i.e. the "x" direction), the distance between the first target 204 and the first optical measurement device 212 may increase or decrease.

Figure 4A:
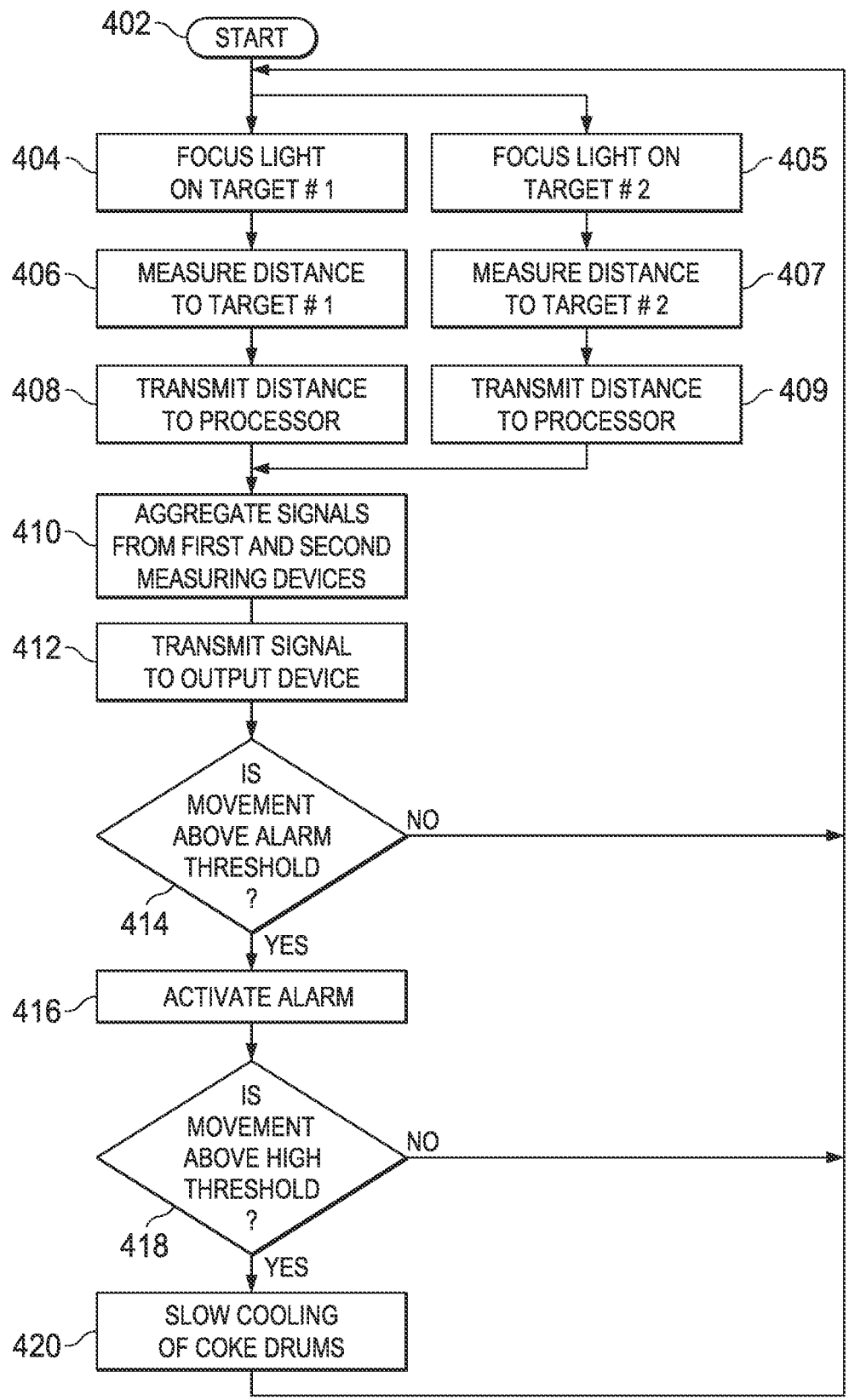
FIG. 4A is a flow diagram illustrating a method of measuring coke-drum deformation according to aspects of the disclosure.

FIG. 4A is a flow diagram illustrating a process 400 of measuring deformation of the coke drum 106. The process 400 begins at step 402. At step 404, the first optical measurement device 210 focuses light on the first target 202. At step 405, the second optical measurement device 212 focuses light on the second target 204. At step 406, the first optical measurement device 210 measures and transmits to the processor 222 a first initial linear distance between the first target 202 and the first optical measurement device 210 along the first horizontal axis 206. In various embodiments, the first initial linear distance between the first target 202 and the first optical measurement device 210 is measured prior to operation of the coke drum 106 and may, for example, be defined as "0" by the processor 222. At step 407, the second optical measurement device 212 measures and transmits to the processor 222, a second initial linear distance between the second target 204 and the second optical measurement device 212 along the second horizontal axis 208. In various embodiments, the second initial linear distance between the second target 204 and the second optical measurement device 212 is measured prior to operation of the coke drum 106 and may, for example, be defined as "0" by the processor 222. At step 408, the first optical measurement device 210 measures and transmits to the processor 222 a signal corresponding to a first operational distance along the first horizontal axis 206 between the first target 202 and the first optical measurement device 210. In various embodiments, the first operational distance is measured during operation of the coke drum 106. At step 409, the second optical measurement device 212 measures and transmits to the processor 222 a signal corresponding to a second operational distance along the second horizontal axis 208 between the second target 204 and the second optical measurement device 212. In various embodiments, the second operational distance is measured during operation of the coke drum 106. At step 410, the processor 222 determines a change in distance along the first horizontal axis 206 and a change in distance along the second horizontal axis 208. The processor 222 aggregates the signals from the first optical measurement device 210 and the second optical measurement device 212 in order to determine a total movement of the coke drum 106.

Still referring to FIG. 4A, at step 412, the processor transmits the total movement of the coke drum 106 to the output device 224. At step 414, the processor 222 compares the total movement of the coke drum 106 to a pre-determined alert threshold and determines if the total movement of the coke drum 106 exceeds the pre-determined alert threshold. If, at step 414, it is determined that the total movement of the coke drum 106 does not exceed the pre-determined alert threshold, the process 400 returns to step 402. If at step 414, it is determined that the total movement of the coke drum 106 exceeds the pre-determined alert threshold, then the processor proceeds to step 416, where a visual or auditory alert is generated. In various embodiments, the alert prompts intervention by an operator of the coke drum 106. In various embodiments, the intervention may include, for example, slowing a rate that water is added to the coke drum in an effort to reduce the cooling rate of the coke drum 106. At step 418, the processor 222 determines if movement of the coke drum 106 exceeds a pre-determined mitigation threshold. If, at step 418, it is determined that movement of the coke drum 106 exceeds the pre-determined mitigation threshold, the process 400 proceeds to step 420. At step 420, the processor 222 may, in various embodiments, direct automatic correction. In various embodiments, the corrective action may include the processor 222 automatically slowing a rate that water is added to the coke drum in an effort to reduce the cooling rate of the coke drum 106. The process 400 then returns to step 402. Thus, the two-axis coke-drum measurement system 200 is capable of providing continuous real-time measurement of deformation of the coke drum 106.

Figure 4B:
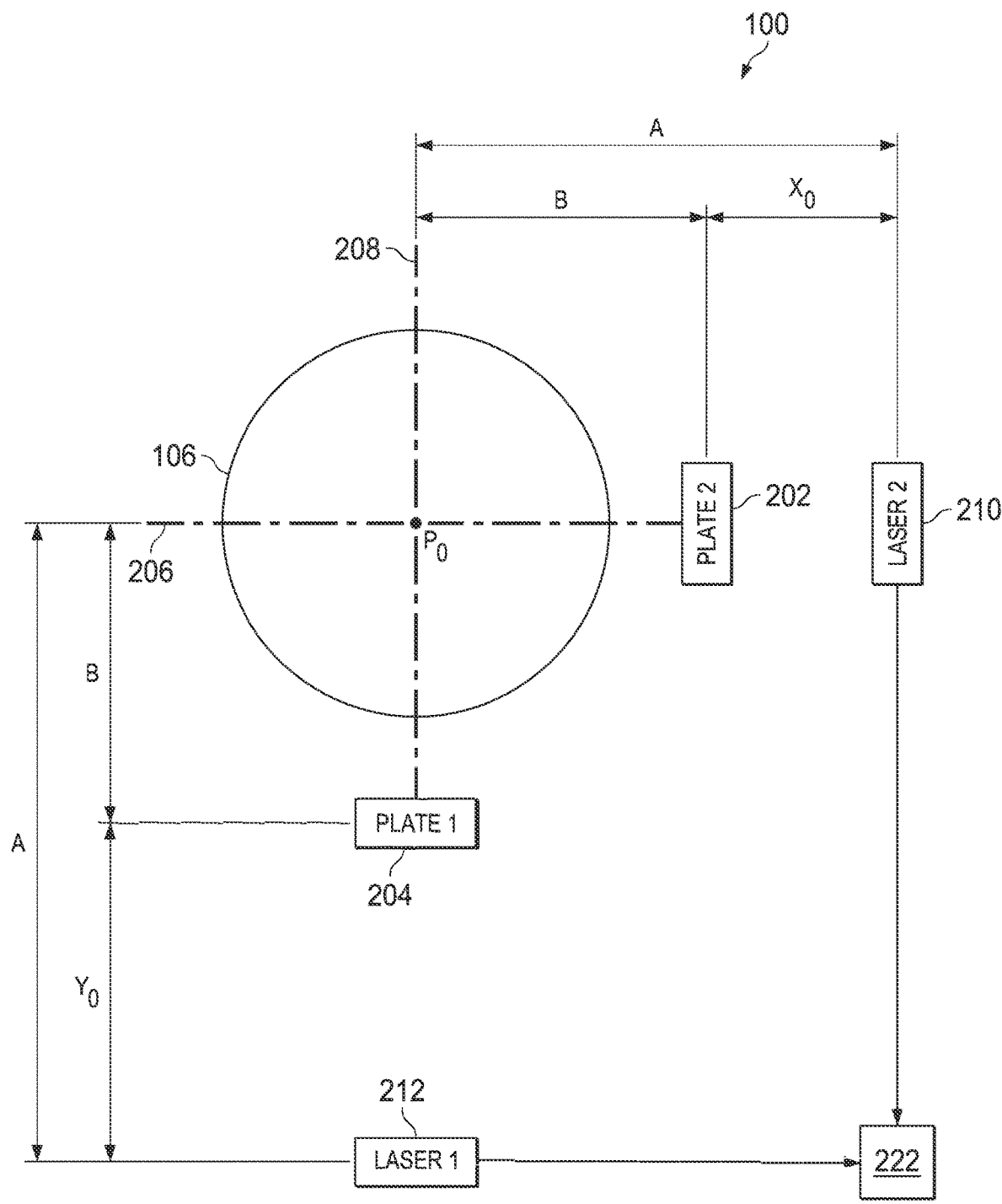
FIG. 4B is a top view of the coke drum system illustrating an initial position of the coke drum.
Figure 4C:
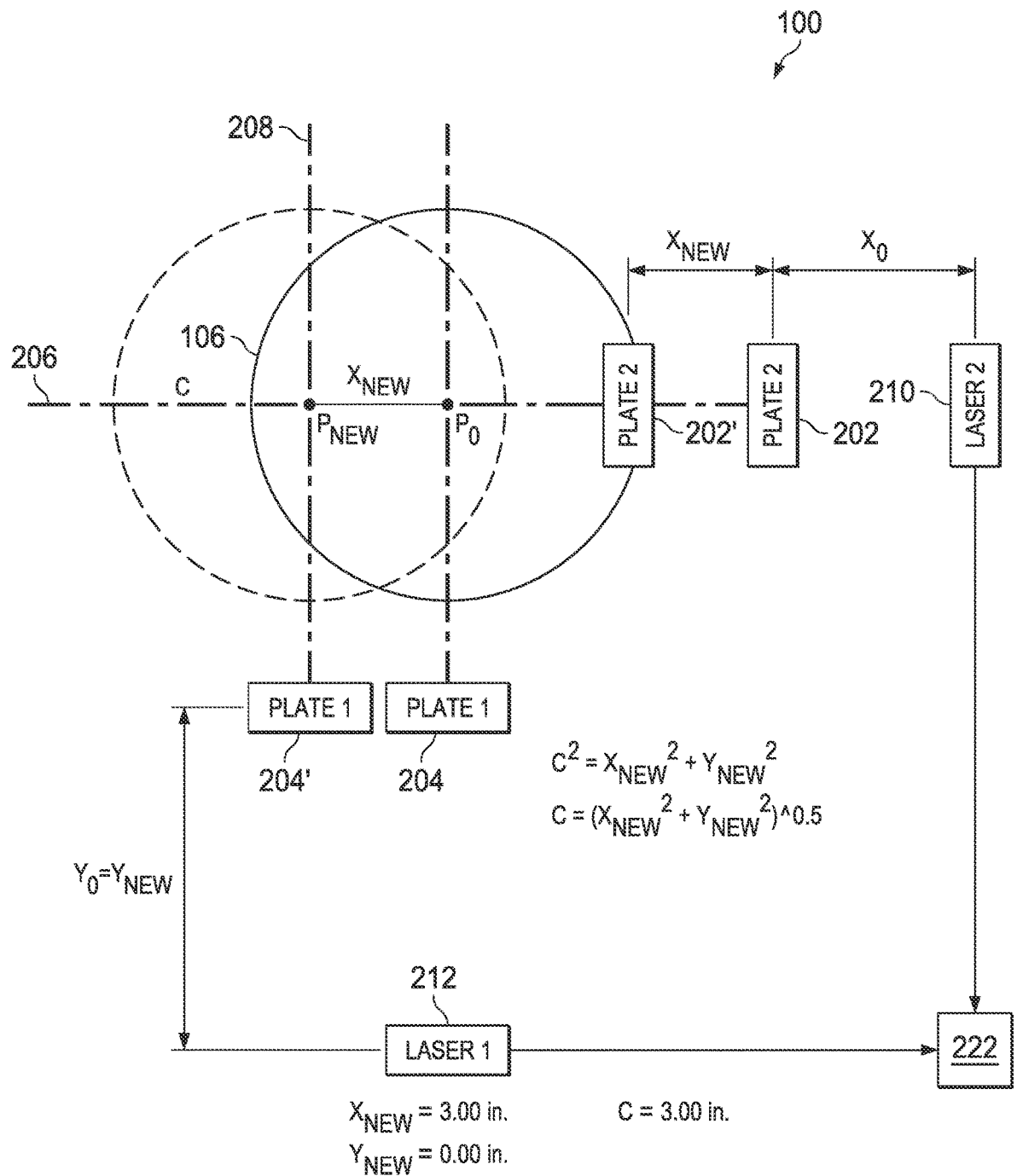
FIG. 4C is a top view of the coke drum system illustrating deflection of the coke drum along the first horizontal axis.
Figure 4D:
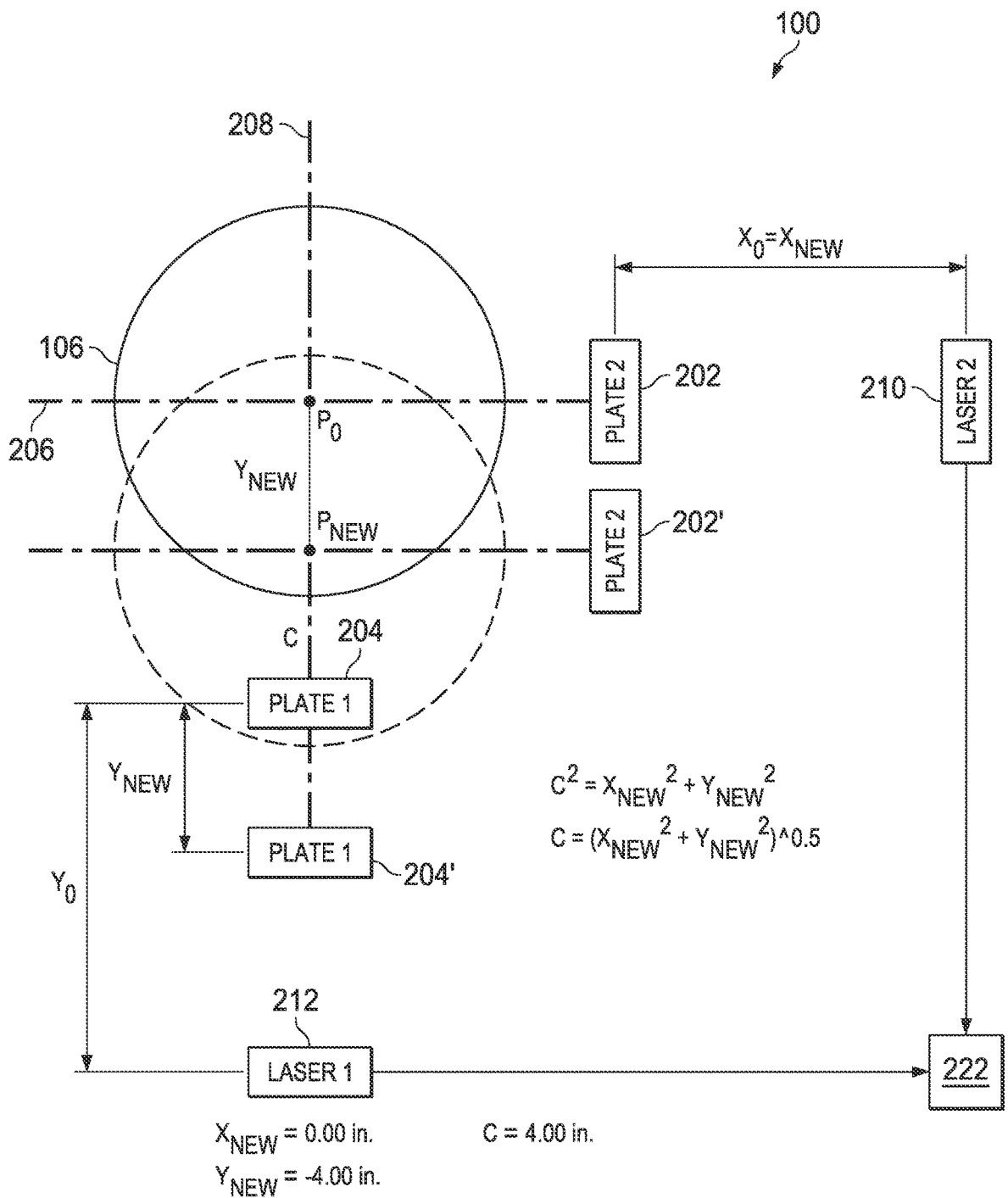
FIG. 4D is a top view of the coke drum system illustrating deflection of the coke drum along the second horizontal axis.
Figure 4E:
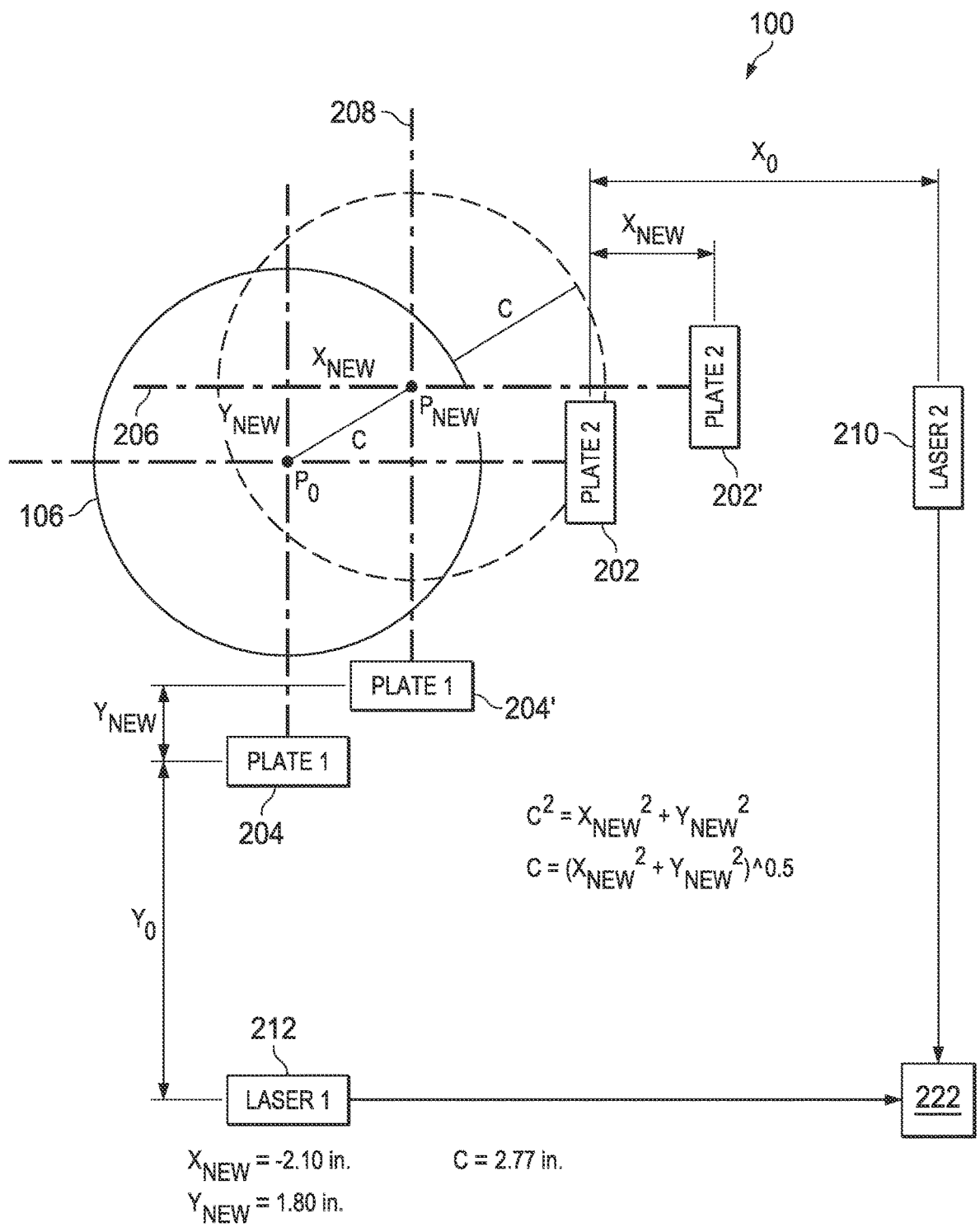
FIG. 4E is a top view of the coke drum system illustrating deflection of the coke drum along both the first horizontal axis and the second horizontal axis.

FIG. 4B is a top view of the coke drum system 100 illustrating an initial position of the coke drum 106. FIG. 4C is a top view of the coke drum system 100 illustrating deflection of the coke drum 106 along the first horizontal axis 206. FIG. 4D is a top view of the coke drum system 100 illustrating deflection of the coke drum 106 along the second horizontal axis 208. FIG. 4E is a top view of the coke drum system 100 illustrating deflection of the coke drum 106 along both the first horizontal axis 206 and the second horizontal axis 208. Referring to FIGS. 4B-4E collectively, the first optical measurement device 210 measures a change in distance between the first target 202 and the first optical measurement device 210 along the first horizontal axis 206. The change in distance between the first target 202 and the first optical measurement device 210 is represented graphically by deflected first target 202'. The second optical measurement device 212 measures a change in distance between the second target 204 and the second optical measurement device 212 along the second horizontal axis 208. The change in distance between the second target 204 and the second optical measurement device 212 is represented graphically by deflected second target 204'. The processor 222 then aggregates the signals received from the first optical measurement device 210 and the second optical measurement device 212, for example, according to the Pythagorean theorem, to determine a total movement of the coke drum 106.

Figure 5:
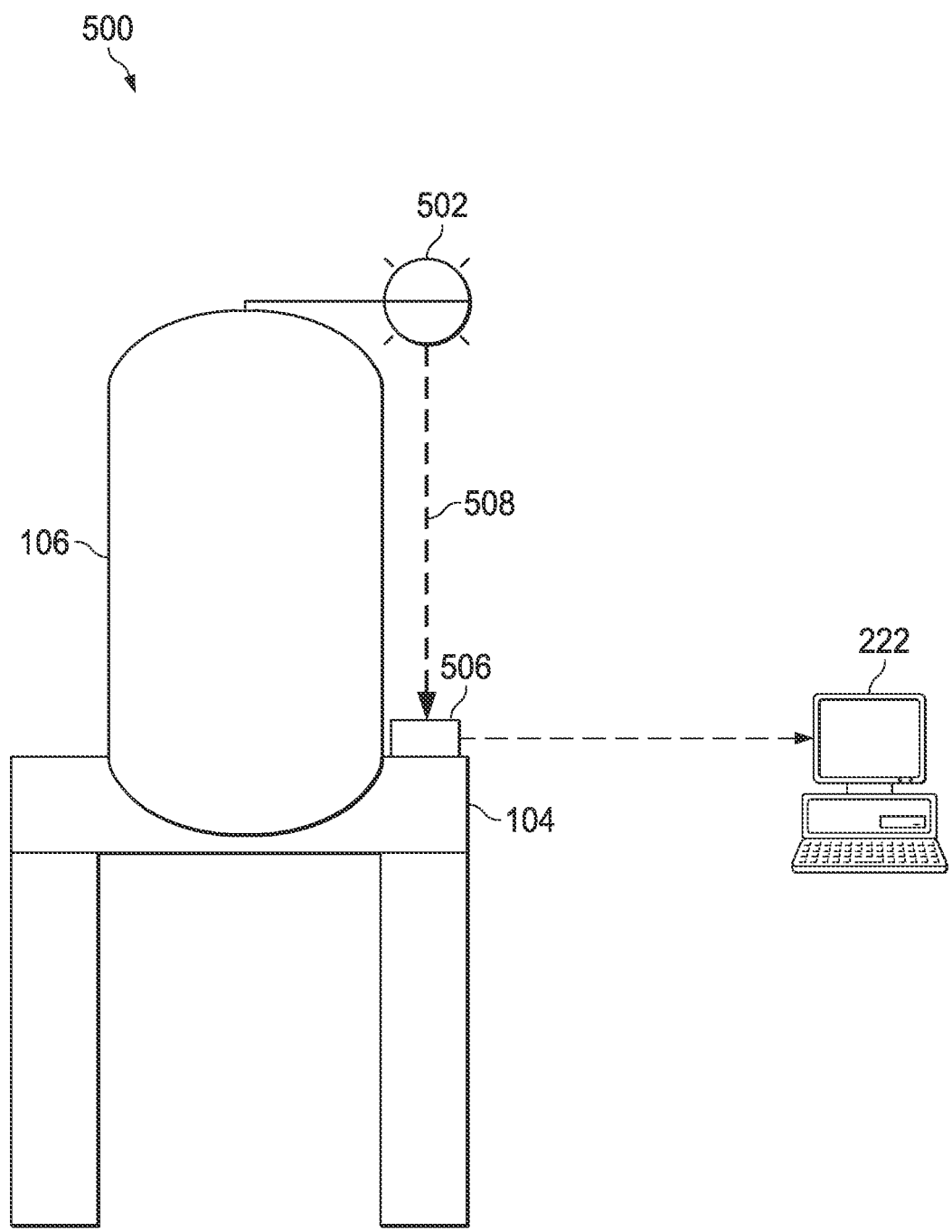
FIG. 5 is a schematic diagram of a single-axis coke-drum measurement system according to aspects of the disclosure.

FIG. 5 is a schematic diagram of a single-axis coke-drum measurement system 500. The single-axis coke-drum measurement system 500 includes an optical measurement device 502 positioned near an upper aspect of the coke drum 106. In various embodiments, the optical measurement device 502 is coupled to an outer surface of the coke drum 106; however, in other embodiments, the optical measurement device 502 may be coupled to other components of the coke drum system 100 that move with the thermal expansion of the coke drum 106 and may not be directly coupled to the coke drum 106. In various embodiments, the optical measurement device 502 is, for example, a laser measurement device; however, other devices could be utilized including, for example, an infra-red device, an electromagnetic device, or other devices capable of directing an electromagnetic beam 508 along a vertical length of the coke drum 106 to a target 506 that is positioned near a base of the coke drum 106. The target 506 is coupled to components of the coke drum system 100 that do not move with the thermal expansion of the coke drum 106 such as, for example, the support pad 104. In various embodiments, the target 506 is able to detect movement of the electromagnetic beam 508 in both an "x" and a "y" direction thereby detecting banana movement of the coke drum 106. The target 506 is electrically coupled to the processor 222. During operation, the target 506 provides a signal to the processor 222 corresponding to a position of the electromagnetic beam 508 on the target 506. The processor 222 converts the signal to a measurement of movement of the coke drum 106 and provides an alert if movement of the coke drum 106 exceeds a pre-determined threshold. In various embodiments, the alert could be, for example, a visual alert, an auditory alert, or a combination of a visual alert and an auditory alert. The pre-determined threshold could be, for example, +/−5 mm.

Figure 6:
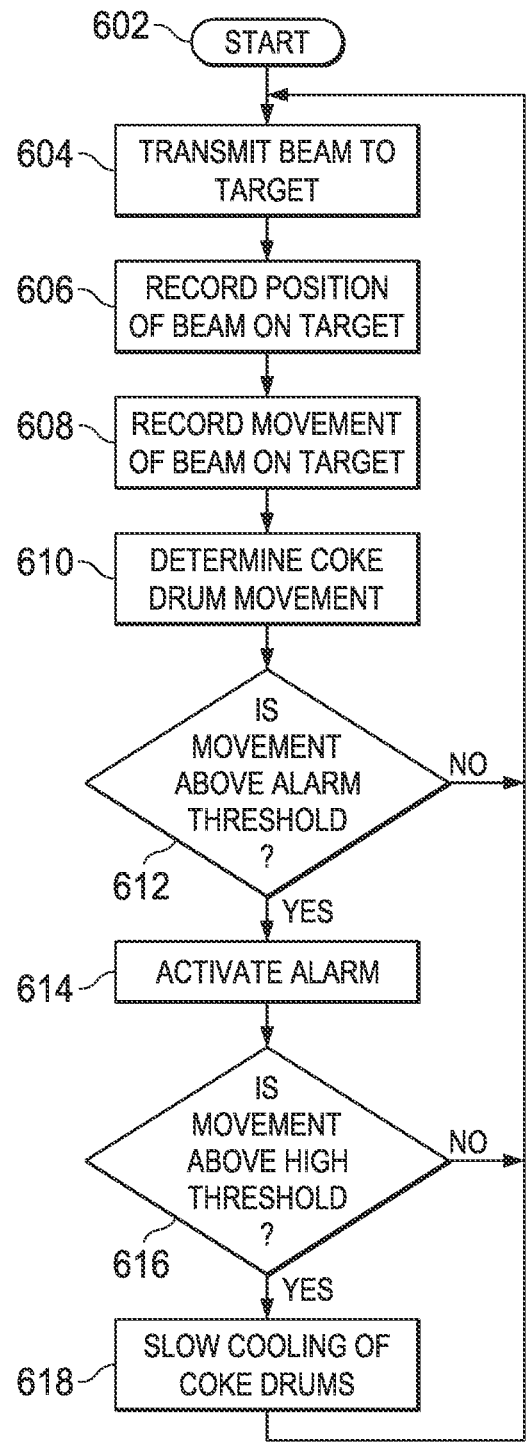
FIG. 6 is a flow diagram illustrating a method of measuring coke-drum deformation according to aspects of the disclosure.

FIG. 6 is a flow diagram illustrating a process 600 of measuring coke-drum deformation. The process 600 begins at step 602. At step 604, the optical measurement device 502 transmits an electromagnetic beam 508 to the target 506. At step 606, the target records a position of the electromagnetic beam 508 on the target 506 and transmits a signal to the processor 222 corresponding to a position of the electromagnetic beam 508 on the target 506. At step 608, the target 506 records movement of the electromagnetic beam 508 on the target 506 and transmits a signal to the processor 222 corresponding to a location of the electromagnetic beam 508 on the target 506. At step 610, the processor 222 interprets the signals received from the target 506 to determine a movement of the coke drum 106. At step 612, the processor determines if a degree of movement of the coke drum 106 exceeds a pre-determined alert threshold. If, at step 612, it is determined that the movement of the coke drum 106 does not exceed the pre-determined alert threshold, the process 600 returns to step 604. If, at step 612, it is determined that the movement of the coke drum 106 exceeds the pre-determined alert threshold, the process 600 proceeds to step 614, where an auditory or visual alert is generated. In various embodiments, the alert prompts intervention by an operator of the coke drum 106. In various embodiments, the intervention may include, for example, slowing a rate that water is added to the coke drum in an effort to reduce the cooling rate of the coke drum 106. At step 616, the processor 222 determines if movement of the coke drum 106 exceeds a pre-determined mitigation threshold. If, at step 616, it is determined that movement of the coke drum 106 exceeds the pre-determined mitigation threshold, the process 600 proceeds to step 618. At step 618, the processor 222 may, in various embodiments, direct automatic correction. In various embodiments, the corrective action may include the processor 222 automatically slowing a rate that water is added to the coke drum in an effort to reduce the cooling rate of the coke drum 106. The process 600 then returns to step 604. Thus, the single-axis coke-drum measurement system 500 is capable of providing continuous real-time measurement of deformation of the coke drum 106.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The term "at least one of" is meant to cover combinations of the listed elements, components, features, and the like, as well as the listed elements, components, features, and the like individually. For example, the phrase "at least one of A and B" is meant to cover embodiments comprising only A, embodiments comprising only B, and embodiments comprising both A and B unless stated otherwise.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A coke drum measurement system comprising:
    a first target coupled to an upper aspect of a coke drum;
    a second target coupled to the upper aspect of the coke drum and arranged generally perpendicular to the first target;
    a first optical measurement device that visualizes the first target and measures a distance between the first optical measurement device and the first target;
    a second optical measurement device that visualizes the second target and measures a distance between the second optical measurement device and the second target;
    a processor electrically coupled to the first optical measurement device and the second optical measurement device, the processor receiving signals from the first optical measurement device and the second optical measurement device corresponding to movement of the coke drum,
    wherein the processor aggregates signals received from the first optical measurement device and the second optical measurement device to determine a total movement of the coke drum;
    wherein the processor is configured to generate an alert in response to a determination that the total movement exceeds a pre-determined alert threshold; and
    wherein the processor is configured to initiate a corrective action in response to a determination that the total movement exceeds a pre-determined mitigation threshold.

2. The coke drum measurement system of claim 1, wherein the first optical measurement device measures a distance between the first optical measurement device and the first target along a first horizontal axis.

3. The coke drum measurement system of claim 2, wherein the second optical measurement device measures a distance between the second optical measurement device and the second target along a second horizontal axis that is generally perpendicular to the first horizontal axis.

4. The coke drum measurement system of claim 1, wherein the first optical measurement device and the second optical measurement device are laser measurement devices.

5. The coke drum measurement system of claim 1, wherein the first target comprises a vertical dimension generally equal to an anticipated vertical thermal growth of the coke drum plus 50 mm.

6. The coke drum measurement system of claim 5, wherein the first target comprises a horizontal dimension generally equal to two times an anticipated banana movement of the coke drum.

7. The coke drum measurement system of claim 1, wherein the second target comprises a vertical dimension generally equal to an anticipated vertical thermal growth of the coke drum plus 50 mm.

8. The coke drum measurement system of claim 7, wherein the second target comprises a horizontal dimension generally equal to two times an anticipated banana movement of the coke drum.

9. A method of measuring coke drum deformation, the method comprising:
    measuring a distance between a first target and a first optical measurement device along a first horizontal axis;
    measuring a distance between a second target and a second optical measurement device along a second horizontal axis;
    transmitting a signal from the first optical measurement device to a processor, the signal corresponding to movement of the coke drum along the first horizontal axis;
    transmitting a signal from the second optical measurement device to the processor, the signal corresponding to movement of the coke drum along the second horizontal axis;
    calculating, via a processor a total movement of the coke drum, wherein the total movement is an aggregate of movement along the first and second horizontal axes;
    initiating, via the processor, an alert in response to a determination that the total movement exceeds a pre-determined alert threshold; and
    initiating, via the processor, a corrective action in response to a determination that the total movement exceeds a pre-determined mitigation threshold.

10. The method of claim 9, comprising directing an electromagnetic beam from the first optical measurement device to the first target.

11. The method of claim 9, comprising directing an electromagnetic beam from the second optical measurement device to the second target.

12. The method of claim 9, wherein the corrective action comprises reducing a rate at which water is added to the coke drum.

13. The method of claim 9, wherein the alert comprises a combination of a visual and an auditory alert.

14. The method of claim 13, wherein the alert is either an auditory or a visual alert.

15. A method of measuring movement of a coke drum, the method comprising:
- transmitting an electromagnetic beam from an optical measurement device to a target;
- recording a location of the electromagnetic beam on the target; and
- determining movement of the coke drum based on movement of the electromagnetic beam on the target;
- initiating, via the processor, an alert in response to a determination that the movement exceeds a pre-determined alert threshold; and
- initiating a corrective action in response to a determination that the movement of the coke drum exceeds a pre-determined mitigation threshold, the corrective action comprising reducing a rate of cooling of the coke drum.

16. The method of claim 15, wherein the optical measurement device is disposed proximate an upper aspect of the coke drum.

17. The method of claim 16, wherein the optical measurement device moves with the coke drum as the coke drum deforms.

18. The method of claim 15, wherein the target is disposed proximate a lower aspect of the coke drum.

19. The method of claim 18, wherein the target does not move with the coke drum as the coke drum deforms.

20. The method of claim 15, wherein the alert comprises a combination of a visual and an auditory alert.

* * * * *